United States Patent [19]

Newell et al.

[11] 3,877,343

[45] Apr. 15, 1975

[54] STORES CARRIERS

[75] Inventors: Cyril Newell, Odiham; Mark Philip Gray Walden, Blacknest, near Alton; John Stephen Yeomans, Cove, all of England

[73] Assignee: The Secretary of State for Defence in Her Britannic Majesty's Government of the United Kingdom of Great Britain and Northern Ireland, London, England

[22] Filed: Dec. 29, 1972

[21] Appl. No.: 319,809

[30] Foreign Application Priority Data

Dec. 31, 1971 United Kingdom............... 60935/71

[52] U.S. Cl.............. 89/1.5 R; 89/1.5 G; 89/1.5 H
[51] Int. Cl............................ B64d 1/04; F41f 5/00
[58] Field of Search............ 244/137 R; 294/83 R; 89/1.5 R, 1.5 G, 1.5 H, 1.5 F

[56] References Cited
UNITED STATES PATENTS 2,478,019  8/1949  Sonntag........................ 89/1.5 G X
2,548,053  4/1951  Pierson et al..................... 89/1.5 G
2,918,324  12/1959  Murphy........................ 89/1.5 G X
3,242,808  3/1966  Nelson et al..................... 89/1.5 R

FOREIGN PATENTS OR APPLICATIONS 328,662  5/1930  United Kingdom................ 89/1.5 G Primary Examiner—Verlin R. Pendegrass
Attorney, Agent, or Firm—Sughrue, Rothwell, Mion, Zinn, Macpeak

[57] ABSTRACT

A carrier for light stores has a pair of jaws movable to engage a specially shaped lug secured to a store. The lug has a pair of inward facing surfaces engaged by the jaws and an outward facing surface engaged by a spring biased member of the carrier which is coupled to the jaws so that upon engagement with the lug of a store the member moves to close the jaws. The coupling is through rollers acting on cams which are integral with the jaws. A release mechanism is operable to reverse the jaw closing action of the rollers and allow the jaws to disengage the lug.

4 Claims, 4 Drawing Figures

STORES CARRIERS

This invention relates to carriers for stores, and finds particular, though not exclusive, application to carriers for light stores on aircraft such as reconnaissance flares, smoke flares, and light bombs, which can be carried on helicopters as well as on fixed wing aircraft.

There are several types of carriers currently in use for carrying light stores. The majority of these employ hooks to engage lugs which must be fitted to the stores and require means to prevent the stores from moving relative to the carriers under the influence of, for example, vibration, inertia and air loads. The usual means comprise a number of pads which press against each store and to which loads, known as crutch loads, are applied. The procedure of engaging a store to a carrier and applying crutch loads is lengthy and tedious.

In another type of carrier a store is held in caliper jaws, the calipers being so radiused that they contact a substantial arc of a store being held. Crutch loads are obtained by applying pressure to the caliper jaws. This type of carrier simplifies engagement and crutching of a store, but any particular carrier is limited as to the stores it can carry by the radius of its calipers. Carriage of stores having diameters incompatible with the caliper radii can only be carried by changing the caliper jaws of the carrier or by insertion of packing material between the jaws and a store.

According to this invention a store carrier, for engaging a lug secured to a store, the lug having relative to the store an outward facing surface and two inward facing surfaces symmetrically disposed relative to the store axis, includes; two jaws, one for engaging each inward facing surface of a lug; a member for bearing against the outward facing surface of the lug, the member being movable between a retracted position corresponding to the jaws engaged condition and an extended position; means for applying a force to the member biasing it from the retracted towards the extended position; means for bringing the jaws into engagement with the lug when the member is in the retracted position; means for locking the jaws in the engaged position and means for unlocking the jaws to allow release of a store.

The means for bringing the jaws into engagement with the lug and the means for locking them into the engaged position are preferably actuated by movement of the member from the extended to the retracted position.

One embodiment of the invention will now be described, by way of example only, with reference to the accompanying diagrammatic drawings, of which:

Figure 2:
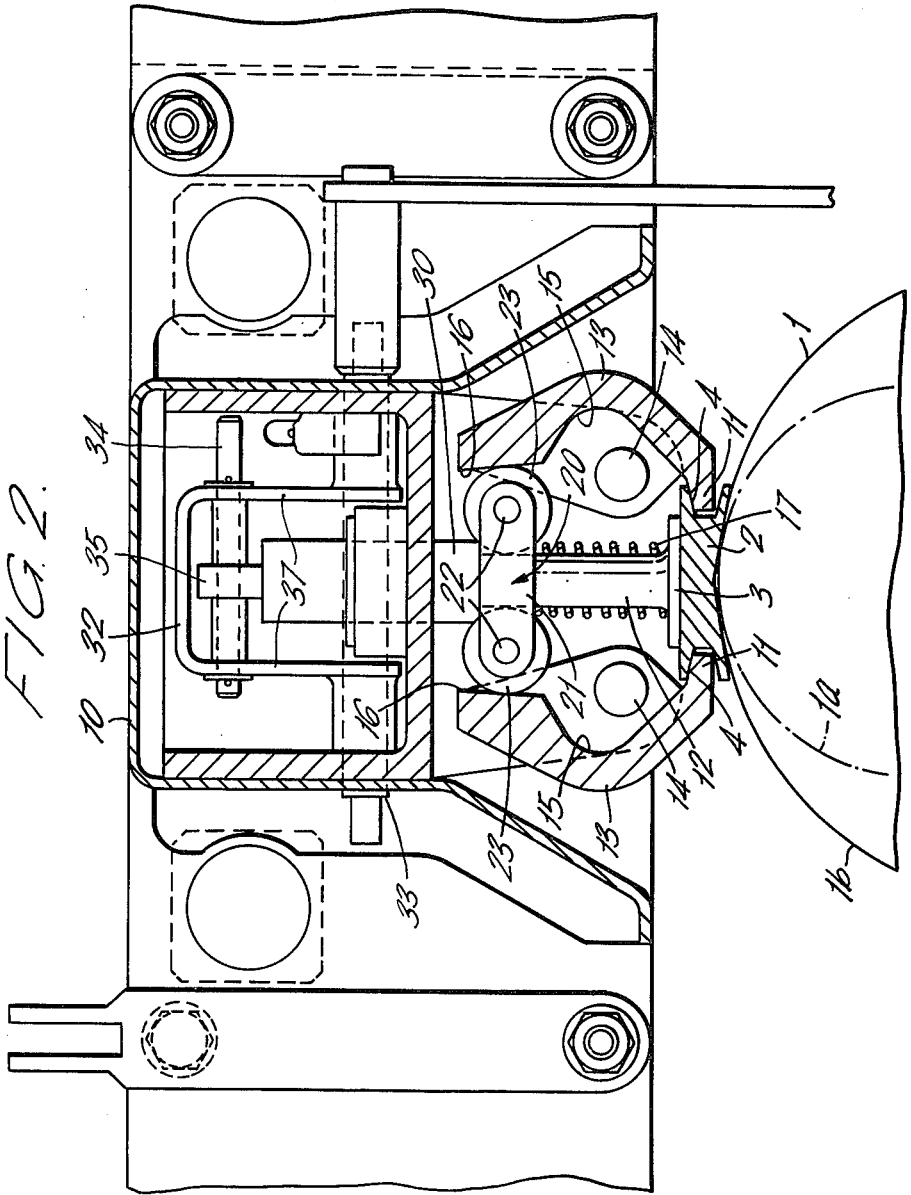
FIG. 2 shows a section along line II—II of FIG. 1.
Figure 3:
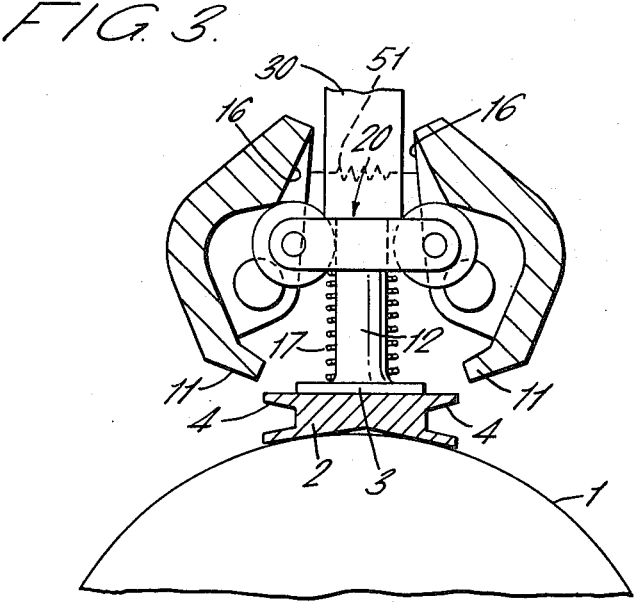
FIG. 3 shows a view similar to that shown in FIG. 2 at the moment of store release.
Figure 4:
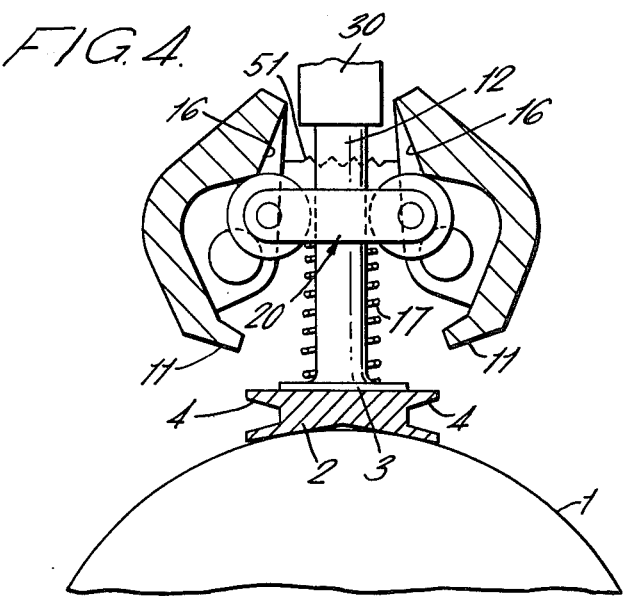
FIG. 4 shows a view similar to that shown in FIG. 2 as a store is offered up to a carrier.

A store 1 has a lug 2 secured thereto. The lug 2 has an outward facing surface 3 and two inward facing surfaces 4 (FIGS. 2, 3, 4). The store 1 is held in position on a weapon carrier 10, which has two legs 50, by jaws 11 which engage the surfaces 4 (FIG. 2) and by a movable member in the form of a cylindrical plunger 12 which bears against the surface 3.

Each jaw 11 is mounted on a cam 13 which is rotatable about pivots 14 on the legs 50 and has an inner bearing surface 15 of roughly cylindrical form and a plane bearing surface 16 on the opposite end of the cam 13 to the jaw 11. The cams 13 are symmetrically mounted one on each side of the plunger 12 and are so constructed that with the jaws 11 engaging the surfaces 4 the plane bearing surfaces 16 are convergent away from the pivots 14. A rat trap spring 51 (shown only schematically in FIGS. 3 and 4) acts on the cams 13 to bias the jaws 11 apart.

An actuator in the form of a roller bearing assembly 20 riding on the plane bearing surfaces 16 and connected to the plunger 12 by a spring 17 in compression holds the surfaces 16 apart and so locks the jaws 11 into engagement with the surfaces 4. The roller bearing assembly 20 comprises two cross members 21, two axle shafts 22 and two rollers 23, one roller 23 for each cam 13.

Figure 1:
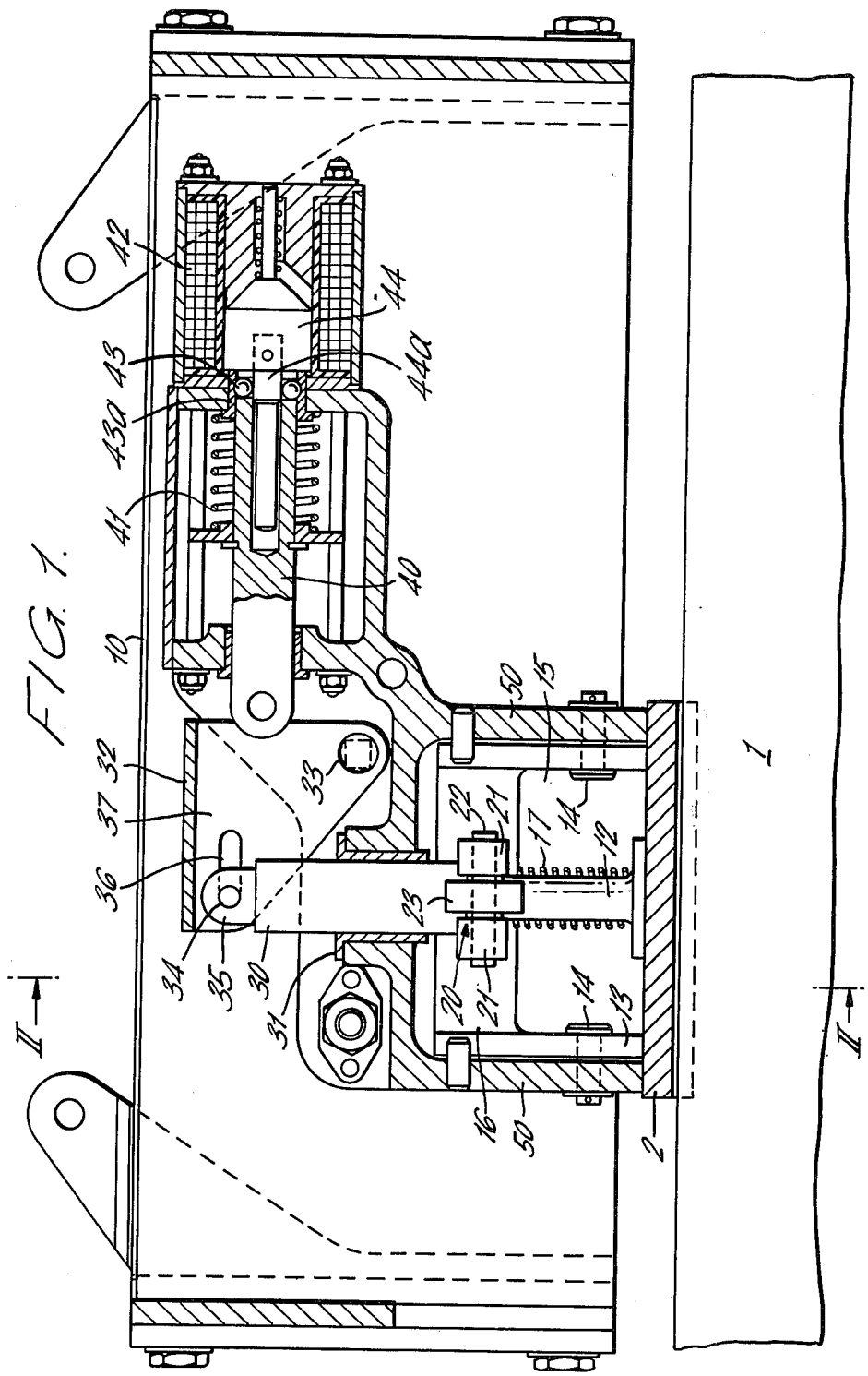
FIG. 1 shows, partly in section, an elevation of a weapon carrier with a store in position.

A ram in the form of a cylindrical member 30, coaxial with and slideable over the plunger 12 and mounted in a sleeve 31 rests on or lies adjacent to the cross members 21 of the roller bearing assembly 20. A bell crank mechanism 32 rotatable about an axle 33 is connected by a spigot 34 to a flange 35 secured to that end of the cylindrical member 30 remote from the roller bearing assembly 20. The spigot 34 is slidable in slots 36 in arms 37 of the bell crank 32. An actuating rod 40 (FIG. 1) is connected to the bell crank mechanism 32 and is held in restraint against a compressed spring 41 by a ball cage 43, the balls of which engage in detents in a sleeve 43a. A solenoid 42 has a slug 44 which is spring biased to the left in FIG. 1 and which has coupled thereto a rod 44a that in the position shown retains the balls of the ball cage 43 in position. The spring 41 is much more powerful than the spring 17 between the plunger 12 and the roller bearing assembly 20.

With a store 1 held in position on the carrier 10 as described above the spring 17 forces the roller bearing assembly 20 into the converging space between the bearing surfaces 16 of the cams 13, locking the jaws 11 into engagement with the surfaces 4 on the lug 2, and along the surfaces 4 until movement is prevented by the surface 3 contacting the extremities of the legs 50. The pressure of the surface 3 on the extremities of the legs 50 and the reaction this causes between the jaws 11 and the surfaces 4 constitute a crutching load which prevents or restricts movement of a store 1 relative to the carrier 10.

Release of a store 1 is initiated by activation of the solenoid 42. The slug 44 is drawn to the right in FIG. 1, bringing a reduced diameter portion of rod 44a adjacent the ball cage 43 thereby allowing the balls to drop clear of the detents in sleeve 43a and so release the actuating rod 40. The spring 41 then forces the actuating rod 40 to the left to rotate the bell crank mechanism 32 and actuate the cylindrical member 30. The cylindrical member 30 forces the roller bearing assembly 20, against the spring 17, clear of the plane bearing faces 16 of the cams 13. The cams 13 then rotate, springing apart the jaws 11 and releasing the lug 2 (FIG. 3). The spring 17, whose compression force will have been increased by movement of the roller bearing assembly 16 towards the lug 2, acts on the plunger 12 to provide a force which positively ejects the lug 2 and hence the store 1 from the carrier 10.

Attachment of a store 1 to the carrier 10 (FIG. 4) is accomplished by first resetting the actuating rod 40 and hence the bell crank 32 and cylindrical member 30. A store 1 is then introduced to the carrier 10 so that the face 3 of a lug 2 bears against the plunger 12. The store 1 is urged towards the carrier 10 thus moving the plunger 12 and urging the roller bearing assembly 20 under the influence of the spring 17 along the inner bearing surface 15 of the cams 13. When the rollers 23 of the roller bearing assembly 20 arrive at the conjunction of the inner bearing surfaces 15 and the plane bearing surface 16 of the cams 13 the spring 17 acts against the force of the rat trap spring which is biasing the jaws 11 apart. Eventually the force of the spring 17 overcomes the force of the rat trap spring, urges the rollers 23 onto the plane bearing surfaces 16 of the cams 13 and closes the jaws 11, bringing them into engagement with the surfaces 4 of the lug 2 (FIG. 2). With this attachment procedure attachment and crutching are accomplished in one manoeuvre.

It will be appreciated that design of the spring 17, the rat trap spring, and the cam surfaces 15, 16 must be coordinated to ensure that the jaws 11 do not close too early. Some overshoot of the plunger 12, relative to the position shown in FIG. 2, before closure of the jaws 11 is permissible, as release of loading pressure on the store 1 will bring the jaws 11 and surfaces 4 into contact.

Lugs 2 can be fitted (by banding, for example) to stores of any diameter, as is indicated by the outlines 1a, 1b, in FIG. 2. This enables carriers according to the invention to be used for a variety of stores. Lugs 2 can also be formed integrally with stores during manufacture of the stores.

Whilst the embodiment of the invention described above uses an electro-mechanical release mechanism the invention is not limited to such a mechanism. For example, a cartridge type ejection system as used on many currently available carriers would be suitable. Alternative means for biasing the jaws 11 apart might be, for example, tension springs secured to the cams 13 on the side of the pivots 14 opposite the jaws 11. Such biasing means might even be dispensed with, separation of the jaws 11 to allow release of a store 1 being accomplished by suitable angling of the jaws 11 and of the surfaces 4 on a lug 2.

In an alternative attachment procedure the jaws 11 are mechanically held apart and the plunger 12 mechanically held in the retarded position to allow a store 1 to be correctly positioned relative to a carrier 10, and then released to contact the surfaces 4 and the surface 3 respectively of a lug 2 on the store 1.

We claim:

1. A store carrier for releasably engaging a lug secured to a store which lug has a first surface facing away from the store and a pair of inclined second surfaces symmetrically disposed relative to the store axis and located between said first surface and the store, and facing towards the store, said store carrier comprising:

a. a first lug engagement means having a pair of pivotably mounted jaws movable between an engaged position in which each jaw engages a respective one of said second lug surfaces and a disengaged position in which said jaws are free of lug;
    b. a second lug engagement means having a member engagable with said first lug surface and movable in a direction normal to the store axis; and
    c. a mechanism for providing a self tightening crutch load upon the lug having first and second relatively movable portions of one of said lug engagement means, said portions having respective surfaces in opposed relationship and being movable apart to tighten the engagement of one of said engagement means with the lug, and movably mounted means biased for movement between said opposed surfaces in a given direction, said biased movably mounted means and said opposed surfaces being shaped to cooperate so as to provide a wedging action to move said first and second portions increasingly apart in response to movement of said biased movably mounted means in said given direction whereby the crutch load on the lug is tightened.

2. A store carrier as claimed in claim 1 wherein: said first and second portions are integral with respective ones of said jaws and said opposed surfaces are at an angle to one another in said engaged position of said jaws to define a wedge shaped space; said biased movably mounted means comprises a pair of rollers mounted on a support member, said rollers contacting respective ones of said opposed surfaces; and spring means biasing said support member in a direction urging said rollers into contact with said wedge shaped space.

3. A store carrier as claimed in claim 2 wherein: said member of said second lug engagement means comrises a shaft portion and an enlarged foot portion which bears against the lug; said opposed surfaces converge in a direction away from the lug; said spring means is a helical compression spring carried about said shaft portion and acting between said foot portion and said roller support member to bias said foot portion onto said first lug surface and said support member toward said wedge shaped space.

4. A store carrier as claimed in claim 1 wherein said first lug engagement means has two pair of jaw members spaced apart in the direction of the longitudinal store axis and coupled for simultaneous actuation whereby the lug is engagable by the jaw members at spaced locations along the length of the lug and wherein said second lug engagement means is disposed to act on said lug at a location intermediate said spaced locations.

* * * * *